(12) United States Patent
Constable et al.

(10) Patent No.: US 7,482,813 B2
(45) Date of Patent: Jan. 27, 2009

(54) THREE-AXIS MARINE ELECTRIC FIELD SENSOR FOR SEAFLOOR ELECTRICAL RESISTIVITY MEASUREMENT

(75) Inventors: Steven C. Constable, San Diego, CA (US); Kerry W. Key, San Diego, CA (US)

(73) Assignee: The Regents of the University of California, Oakland, CA (US)

( * ) Notice: Subject to any disclaimer, the term of this patent is extended or adjusted under 35 U.S.C. 154(b) by 0 days.

(21) Appl. No.: 11/573,392

(22) PCT Filed: Aug. 25, 2005

(86) PCT No.: PCT/US2005/030265

§ 371 (c)(1),
(2), (4) Date: Feb. 7, 2007

(87) PCT Pub. No.: WO2006/026361

PCT Pub. Date: Mar. 9, 2006

(65) Prior Publication Data

US 2008/0094067 A1 Apr. 24, 2008

Related U.S. Application Data

(60) Provisional application No. 60/604,199, filed on Aug. 25, 2004.

(51) Int. Cl.
*G01V 3/02* (2006.01)
*G01V 3/15* (2006.01)

(52) U.S. Cl. ........................ 324/365; 324/347

(58) Field of Classification Search ............ 324/323, 324/326, 329, 347–350, 354, 357–358, 365, 324/691; 367/15; 702/5, 15–16, 57
See application file for complete search history.

(56) References Cited

U.S. PATENT DOCUMENTS 2,293,024 A 8/1942 Klipsch (Continued)

FOREIGN PATENT DOCUMENTS

FR 2 575 296 A1 6/1986

OTHER PUBLICATIONS

Paul, A.C., "Evolution of Wireline Well-Logging Technique (The Eye of Oil Industry) in India and Advances Beyond 2000", *Geohorizons*, Jan. 2002.

(Continued)

*Primary Examiner*—Bot LeDynh
(74) *Attorney, Agent, or Firm*—Procopio, Cory, Hargreaves & Savitch, LLP

(57) ABSTRACT

A sensor for electric field measurement at the floor of a body of water has at least one pair of square or rectangular electrodes (139, 140) with a known area positioned in parallel separated by a distance and connected by a resistor (120) having a value that matches the resistance of the water between the electrodes. The detected electric fields may be naturally-occurring or artificially generated using a controlled electromagnetic (EM) source. In a preferred embodiment, three pairs of square or rectangular parallel electrodes (139-144) are arranged to form the six sides of a rectangular prism or cube, thus providing for electric field measurement along three axes to provide horizontal and vertical measurements of a hydrocarbon reservoir or other feature of interest under the floor of the body of water.

14 Claims, 4 Drawing Sheets

U.S. PATENT DOCUMENTS

| | | | |
|---|---|---|---|
| 2,531,088 | A | 11/1950 | Thompson |
| 2,839,721 | A | 6/1958 | Witte |
| 2,872,638 | A | 2/1959 | Jones |
| 3,052,836 | A | 9/1962 | Postma |
| 4,047,098 | A | 9/1977 | Duroux |
| 4,298,840 | A | 11/1981 | Bischoff et al. |
| 4,617,518 | A | 10/1986 | Srnka |
| 5,284,142 | A | 2/1994 | Goble et al. |
| 5,770,945 | A | 6/1998 | Constable |
| 6,295,512 | B1 | 9/2001 | Bryant |
| 6,480,000 | B1 | 11/2002 | Kong et al. |
| 6,603,313 | B1 | 8/2003 | Srnka |
| 6,859,038 | B2 | 2/2005 | Ellingsrud et al. |
| 7,109,717 | B2 | 9/2006 | Constable |
| 7,116,108 | B2 | 10/2006 | Constable |
| 2003/0043692 | A1 | 3/2003 | Ellingsrud et al. |
| 2003/0048105 | A1 | 3/2003 | Ellingsrud et al. |
| 2003/0052685 | A1 | 3/2003 | Ellingsrud et al. |
| 2005/0077902 | A1 | 4/2005 | MacGregor et al. |

OTHER PUBLICATIONS

Cox, C.S. et al., "Controlled-source electromagnetic sounding of the oceanic lithosphere" (Mar. 6, 1986) *Nature*, vol. 320, No. 6057, pp. 52-54.

Sinha, M.C., et al., "An Active Source Electroagnetic Sounding System for Marine Use" *Marine Geophysical Researches* 12:59-68 (1990).

Constable, S., et al., "Marine controlled-source electromagnetic sounding 2. The Pegasus experiment" *Journal of Geophysical Research*, vol. 101, No. B3, pp. 5519-5530 (Mar. 10, 1996).

Flosadottir, A.H., et al., "Marine controlled-source electromagnetic sounding 1. Modeling and experimental design" *Journal of Geophysical Research*, vol. 101, No. B3, pp. 5507-5517 (Mar. 19, 1996).

MacGregor, L, et al., "Electrical resistivity structure of the Valu Fa Ridge, Lau Basin, from marine controlled-soiurce electromagnetic sounding", *Geophys. J. Int.* (2001) 146, 217-236.

Eidesmo, T., et al., "Sea Bed Logging (SBL), a new method for remote and direct identification of hydrocarbon filled layers in deepwater areas", *First Break* vol. 20.3 (Mar. 2002), pp. 144-152.

Ellingsrud, S., et al., "Remote sensing of hydrocarbon layers by seadbed logging (SBL): Results from a cruise offshore Angola", *The Leading Edge* (Oct. 2002), pp. 972-982.

Everett, Mark E., et al., "Effects of near-surface conductance on global satellite induction responses", *Geophysical Journal International*, 15:37 (Mar. 7, 2003), pp. 277-286.

Very low noice 3-axis underwater electric field sensor, copyright 1999, Ultra Electronics Holdings plc, http://www.ultra.demon.co.uk/verlylow.htm.

THREE-AXIS MARINE ELECTRIC FIELD SENSOR FOR SEAFLOOR ELECTRICAL RESISTIVITY MEASUREMENT

RELATED APPLICATIONS

This application is a 371 National stage of International Application No. PCT/US05/30265, filed Aug. 25, 2005, which claims the priority of U.S. Provisional Application No. 60/604,199, filed Aug. 25, 2004. This application is also related to U.S. application Ser. No. 10/518,107, filed Dec. 10, 2004, which is the U.S. national stage of International Application No. PCT/US2003/18522, filed Jun. 11, 2003, and U.S. application Ser. No. 10/538,326, filed Jun. 10, 2005, which is the U.S. national stage of International Application No. PCT/US2003/39309, filed Dec. 10, 2003. Each of the related applications is incorporated herein by reference.

FIELD OF THE INVENTION

The invention relates to a system and method for measuring the electric fields on the seafloor in two horizontal and one vertical directions.

BACKGROUND OF THE INVENTION

Measurement of electrical resistivity beneath the seafloor has assumed an important role in hydrocarbon, e.g., oil or natural gas, exploration and reservoir assessment and development. Seismic methods have traditionally been used for such purposes, however, the results can be ambiguous. Several electromagnetic methods have been developed for mapping sub-seafloor resistivity variations. See, for example, U.S. Pat. No. 5,770,945 of Constable (magnetotelluric (MT) methods), WO 03/104844 of Constable (MT and controlled electromagnetic (EM) source methods), WO 04/53528 of Constable (controlled EM source for monitoring), U.S. Pat. No. 6,522,146 OF Srnka (controlled EM source), International Publication No. WO 03/048812 of MacGregor and Sinha (controlled EM source), and International Publication No. WO 01/57555 of Rees (controlled EM source). The disclosure of each of the identified patent documents is incorporated herein by reference.

The magnetotelluric (MT) method is an established technique that uses measurements of naturally occurring electromagnetic fields to determine the electrical resistivity, or conductivity, of subsurface rocks. An MT survey employs time series measurements of orthogonal components of the electric and magnetic fields, which define a surface impedance. This impedance, observed over a broad band of frequencies and over the surface, determines the electrical conductivity distribution beneath that surface, with horizontal layers of the earth being mathematically analogous to segments of a transmission line. Principal factors affecting the resistivity of subsurface materials include temperature, pressure, saturation with fluids, structure, texture, composition and electrochemical parameters. Resistivity information may be used to map major stratigraphic units, determine relative porosity or support a geological interpretation. A significant application of MT surveying is oil exploration. An MT survey may be performed in addition to seismic, gravity and magnetic data surveys. A combination of data from two or more different survey methods leads to a more complete understanding of subsurface structure than may be possible through the use of any single technique alone, particularly where the structure is such that measurement using a given technique may be contraindicated.

For example, certain structures such as sediments buried under salt, basalt or carbonate have poor seismic performance and productivity. These structures generate strong reflections and reverberations, making imaging of the buried sediments difficult using acoustic methods alone. On the other hand, because the MT method does not involve the measurement of responses to artificially-created seismic events, it can be utilized in lieu of or in combination with seismic methods to minimize the error induced by reflections.

Another type of electromagnetic field measurement utilizing controlled EM source (CSEM) methods is well known the art and has become almost routine for mapping of electrical conductivity of the seafloor in very shallow to deep ocean water, achieving seafloor penetration depths as great as 30 km in 5 km of water. Such methods have provided significant economic savings in terms of avoiding the costs of drilling test wells into sub-seafloor structures that do not contain economically recoverable amounts of hydrocarbon.

The current technologies described above typically require antennas of several meters in length (usually about 10 m or longer) to make low noise measurements of seafloor electric fields. Seafloor deployment and recovery of systems with these long antennas can be difficult, and the antennae are subject to damage during handling.

Another disadvantage of existing technologies is that releasable anchors such as the one described in U.S. Pat. No. 5,770,945 are sometimes prohibited as part of the permitting process for seafloor exploration in sensitive areas. The inability to use such anchors introduces significant challenges for deployment and recovery of survey units.

Compact underwater sensors have been developed for applications such as underwater surveillance and submarine detection. One such sensor is the three-axis underwater electric field sensor available from Ultra Electronics Holdings plc of Staffordshire, England. This sensor is effective for detection of electronics fields resulting from submarine or ship movement, where accurate quantitative measurement is not required. Because the sensor construction causes distortion of the electric fields and it is not easily calibrated, this sensor is not capable of providing the precise resistivity measurements needed to hydrocarbon reservoir surveying.

Accordingly, the need remains for a survey system capable of measuring seafloor electric fields without requiring the use of long antenna extending along one or all axes of measurement and which is more easily deployed and recovered. The present invention provides a significant advantage in allowing seafloor electric fields to be measured using a much smaller sensor (one meter or less) that can be easily deployed and retrieved using a remotely operated vehicle (ROV), which is logistically very attractive.

BRIEF SUMMARY OF THE INVENTION

It is an advantage of the present invention to provide a compact antenna structure for use in seafloor electric field measurement.

It is a further advantage of the present invention to provide an antenna structure capable of measuring both horizontal and vertical electric fields to enable measurement of hydrocarbon reservoir width and depth.

Another advantage of the present invention is to provide a compact electric field sensor that can be deployed to and recovered from the seafloor using a ROV.

In an exemplary embodiment, the present invention comprises at least one pair of square or rectangular electrodes having a known area positioned in parallel separated by a distance and connected by a resistor having a value that matches the resistance of seawater between the electrodes. The voltage signal across the resistor is input into a low noise amplifier, the output of which is fed to a seafloor logging processor, for example, of the type described in U.S. Pat. No. 5,770,945. The processor collects time series of amplified electric field signals over a pre-determined period of time, for example, several hundred seconds to several days. The detected electric fields may be naturally-occurring or artificially generated using a controlled electromagnetic (EM) source. In a preferred embodiment, three pairs of square or rectangular parallel electrodes are arranged to form the six sides of a rectangular prism or cube, thus providing for electric field measurement along three axes.

In an experimental prototype, the electrode cube was mounted on top of a survey unit for use in seafloor geological survey, such as the unit described in U.S. Pat. No. 5,770,945. The three electrode pairs were assembled in a frame and covered on the outer surface of the cube with an insulating material such as polyethylene or polypropylene. The electrodes were coupled to an amplifier, preferably a high gain, low input impedance, high frequency amplifier, which is connected to a data logging processor for recording the amplified signals. This combination of components was adapted to take measurements of the horizontal and vertical components of an electric field generated by a controlled EM source or could use a transfer function between vertical electric fields and horizontal electric or magnetic fields to calculate magnetotelluric impedance. The values of the measured control signals, or the magnetotelluric impedance, can be used to infer seafloor geological structure.

In the preferred embodiment, the electrode cube with three electrode pairs serves as a housing to encase the amplifier and data logging processor components, so that the cube itself represents the survey unit. The cube's frame is attached to a lifting bail, hook, or other handling means that allows the cube to be manipulated and transported using a ROV (remotely operated vehicle) for deploying and retrieving the sensor. Alternatively, the cube can be a component of a cable array of a plurality of sensors such as that disclosed in International Application No. PCTIUS2003/39309 of the present inventor.

In one aspect of the invention, a system for mapping electrical conductivity of the seafloor comprises a plurality of survey units, each unit comprising an assembly adapted for deployment at a target area on the seafloor for measurement of vertical and horizontal electric and, if so equipped, magnetic fields.

BRIEF DESCRIPTION OF THE DRAWINGS

The accompanying drawings, which are incorporated in and form a part of the specification, illustrate exemplary embodiments of the present invention and, together with the description, disclose the principles of the invention, wherein.

DETAILED DESCRIPTION OF THE INVENTION

According to the present invention, a system for geological survey includes a plurality of surveying units deployed at different positions on the seafloor within an area of interest for mapping of the seafloor structure. Typically, the surveying units will be deployed from a ship adapted for efficient handling of the units, e.g., with a crane or extendable arm. Data accumulated in each of the units is collected for processing. Further description of the set-up of such a system is provided in U.S. Pat. No. 5,770,945 and will not be repeated here. The unit described herein, including all materials and any stated dimensions, corresponds to a prototype unit constructed by the inventor for experimental purposes and provides an example of how a surveying unit might be constructed. Accordingly, the following detailed description of the exemplary embodiment is not intended to be limiting.

Figure 1:
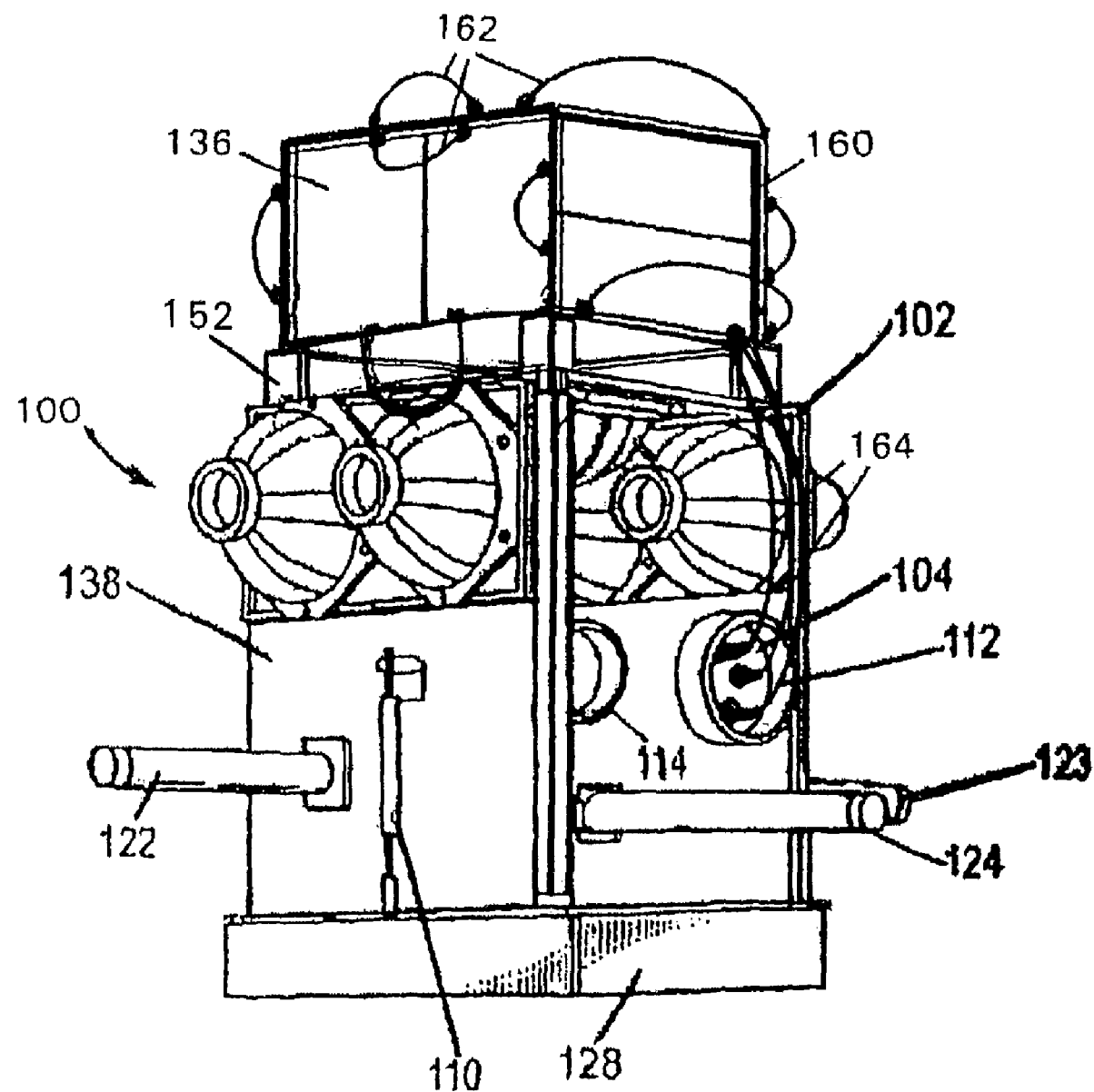
FIG. 1 is a perspective view of a prototype implementation of a seafloor survey unit incorporating a three-axis electric field sensor of the present invention.

FIG. 1 illustrates a first exemplary embodiment of surveying unit 100 for deployment to the seafloor in the system and method of the present invention. In the exemplary embodiment, surveying unit 100 can generally be grouped into four main components. The first component, the logger unit, includes a multi-channel digital data logging processor 104, magnetic field post amplifier and electric field amplifiers, all contained within a first waterproof pressure case 112. The second component is a second waterproof pressure case 114 containing an acoustic navigation/release system 116. As will be apparent to those of skill in the art, the components of the logger unit and the navigation/release system can be combined into a single waterproof pressure case, or more than two waterproof enclosures can be used to house the electronic instruments. Accordingly, the division of components into two pressure cases as described herein is exemplary only and is not intended to be limiting.

The third component consists of at least one pair, and preferably three pairs, of electrodes 139-144 for detection of electric fields. The electrodes are described in more detail below with reference to FIGS. 2 and 3. The fourth unit includes magnetic induction coil sensors 122-124. All elements of the system are mounted on or attached to a corrosion-resistant plastic, e.g., polyethylene, and aluminum or stainless steel frame 138 along with glass spheres 126 for flotation and an anchor 128 for deployment to the seafloor. A lifting bail 102 is attached to the top of, or incorporated into, frame 138 for convenient handling during deployment and recovery. The entire system is capable of resisting water pressure to a depth of 6000 m (up to 8000 psi.) Apart from the electrode structure for three-axis electric field measurement, all components of the exemplary survey unit of FIG. 1 are disclosed in U.S. Pat. No. 5,770,945 as well as in International Publication No. WO 03/104844, and details are not repeated herein.

Figure 2:
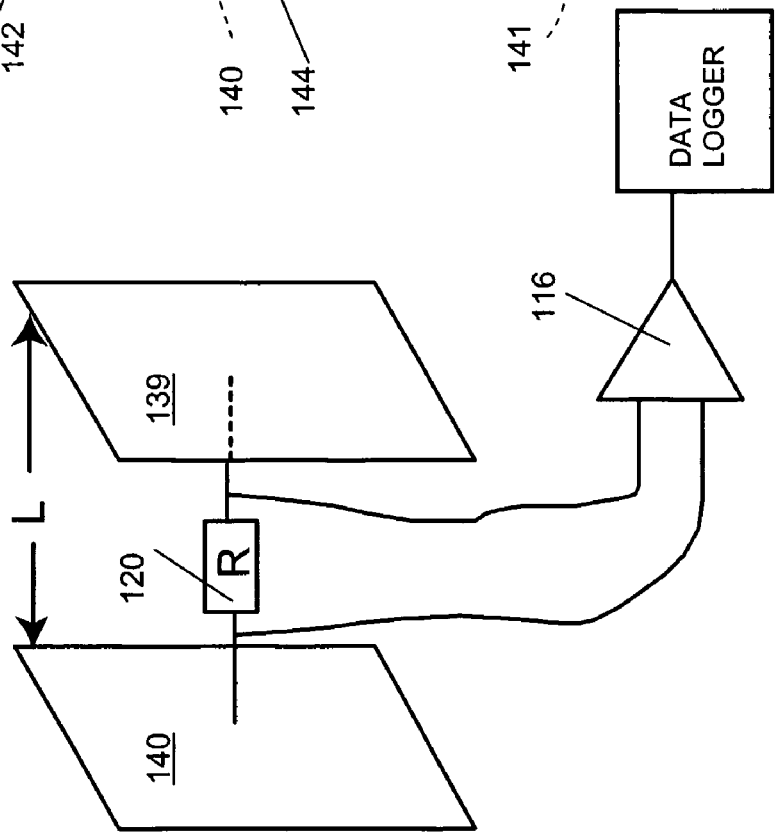
FIG. 2 is a diagrammatic view of a sensor according to the present invention.

Referring to FIG. 2, the details of the electric field sensor are provided. Two square or rectangular electrodes 139 and 140, preferably, but not limited to, Ag-AgCl, are positioned parallel to each other separated by distance L and connected by resistor 120 having a resistance value R. By selecting resistance value R to match the resistance of seawater between electrodes 139 and 140, the electric fields in seawater will not be distorted and can be measured faithfully for use in calculating the resistivity and, thus, the dimensions of a hydrocarbon reservoir or other measurable geological feature of interest in the seafloor. Resistance R is given by:

$$R = rL/a, \tag{1}$$

where a is the area of each electrode of the pair and r is the resistivity of seawater, which is typically 0.3 Ohm-m. Using Equation 1, to provide a simple example, for electrodes in a pair where each electrode has an area of one meter square and separated by 1 meter, resistor 120 would have a resistance value R=0.3 Ohm. The voltage signal across R is measured by a low-noise amplifier 116, for example, the amplifier described in U.S. Pat. No. 5,770,945, providing output to a data logger 104, for example, of the type described in U.S. Pat. No. 5,770,945. Ideally, the input impedance of amplifier 116 would also equal R, making the system optimally low noise.

The electrodes 139 and 140 are large area electrodes that may be formed using fabrication techniques that are known in the art, such as chemical vapor deposition, sputtering, thin film or thick film (paste) processes, or other means for applying a conductive coating to a substrate. Layers of conductive coating, e.g., Ag-AgCl, gold, or other suitable conductor, and electrolyte may be applied to one or more insulating substrates, which are then attached to the inner surface of a protective outer skin. The outer skin may be polyethylene or similar corrosion-resistant plastic or polymer which is affixed to a frame 160, as illustrated in FIG. 1. In a prototype sensor that was constructed, the electrodes were 30 cm on a side, however, the electrode dimensions can be smaller, or much larger, e.g., 1 meter on a side.

Figure 3:
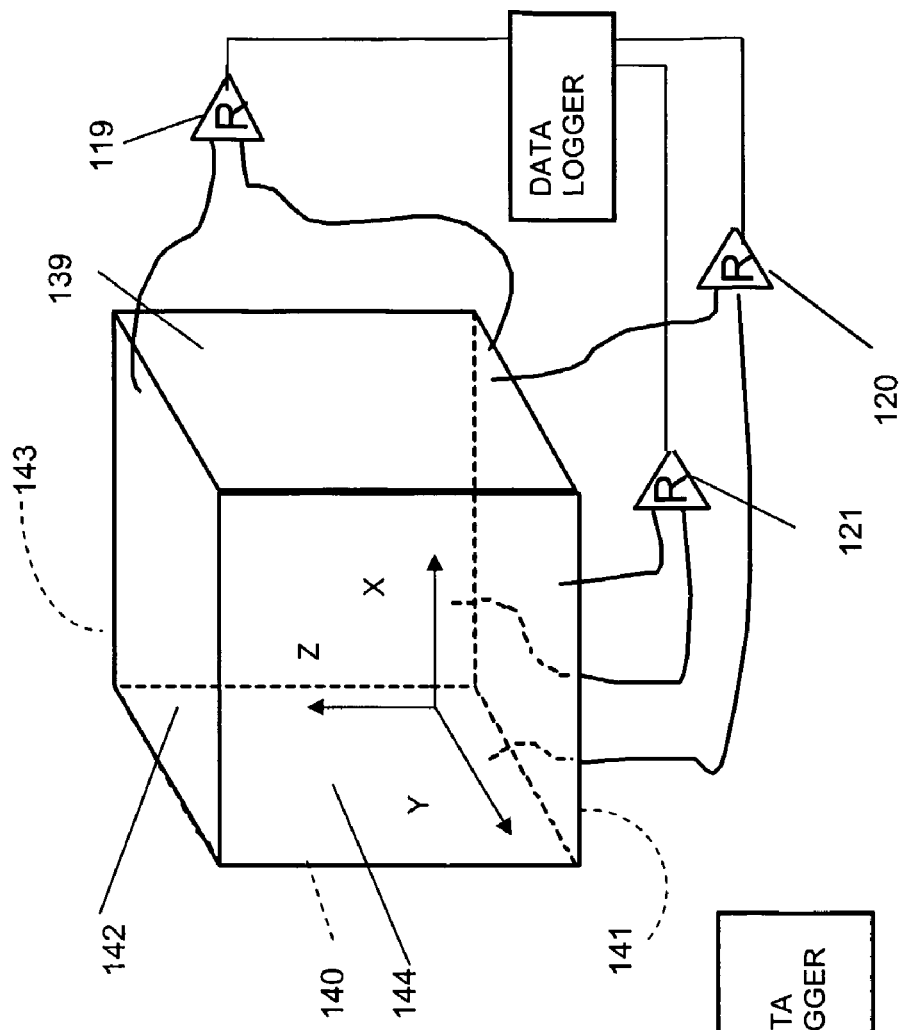
FIG. 3 is a diagrammatic view of three sensors arranged for electric field detection along three axes.

FIG. 3 diagrammatically illustrates how three of the electrode pairs of FIG. 2 can be joined together in an orthogonal arrangement to form a rectangular prism or cube for sensing the electric field in three directions. Each electrode pair 139-140, 141-142 and 143-144 is connected by a resistor 120, 119 and 121, respectively, have a resistance value selected to match the seawater resistance. Each electrode pair detects the electric field in the direction that is parallel to the direction of separation between the two plates of the electrode. Specifically, the signal produced by electrode pair 139-140 represents the horizontal field along the x-axis, the signal produced by the electrode pair 143-144 represents the horizontal field along the y-axis, and the signal produced by electrode pair 141-142 represents the vertical field along the z-axis. As illustrated, the resistors 199-121 are combined with a high gain electric field amplifier having an input impedance that matches the resistance value R of the corresponding resistor. The amplified signal from each amplifier is fed into a separate channel of a data logging processor, as described and illustrated in International Publication No. WO 03/104844.

Each electrode 139-144 forms the size of a box 136, which may be rectangular or cubic. In the experimental prototype, the box has dimensions on the order of 30 cm per side so that a cube 136 is formed. It should be noted that the electrode assembly 136 is not limited to a cube of equal sides, but that the electrode pairs can be longer in one dimension so that the sides of the "box" are rectangular. In such a configuration, the resistance values will need to be selected to comply with the relationship set forth in Equation 1 for each electrode pair. The sides of the cube are retained within frame 160 through which connectors are passed to connect the electrodes to cables 162 that are located external to the assembly. As shown in FIG. 1, cables 162 provide connections across the resistors and cables 164 to their corresponding amplifiers and data logging processor 104 housed in watertight housing 112. To reduce the risk of distortion of the electric field, all sides of box 136 should be separated from adjacent structures to ensure that each electrode is in contact with the seawater. Thus, in the embodiment of FIG. 1, frame 160 includes spacers 152 that hold box 136 above and separated from the other components of survey unit 100.

Figure 4:
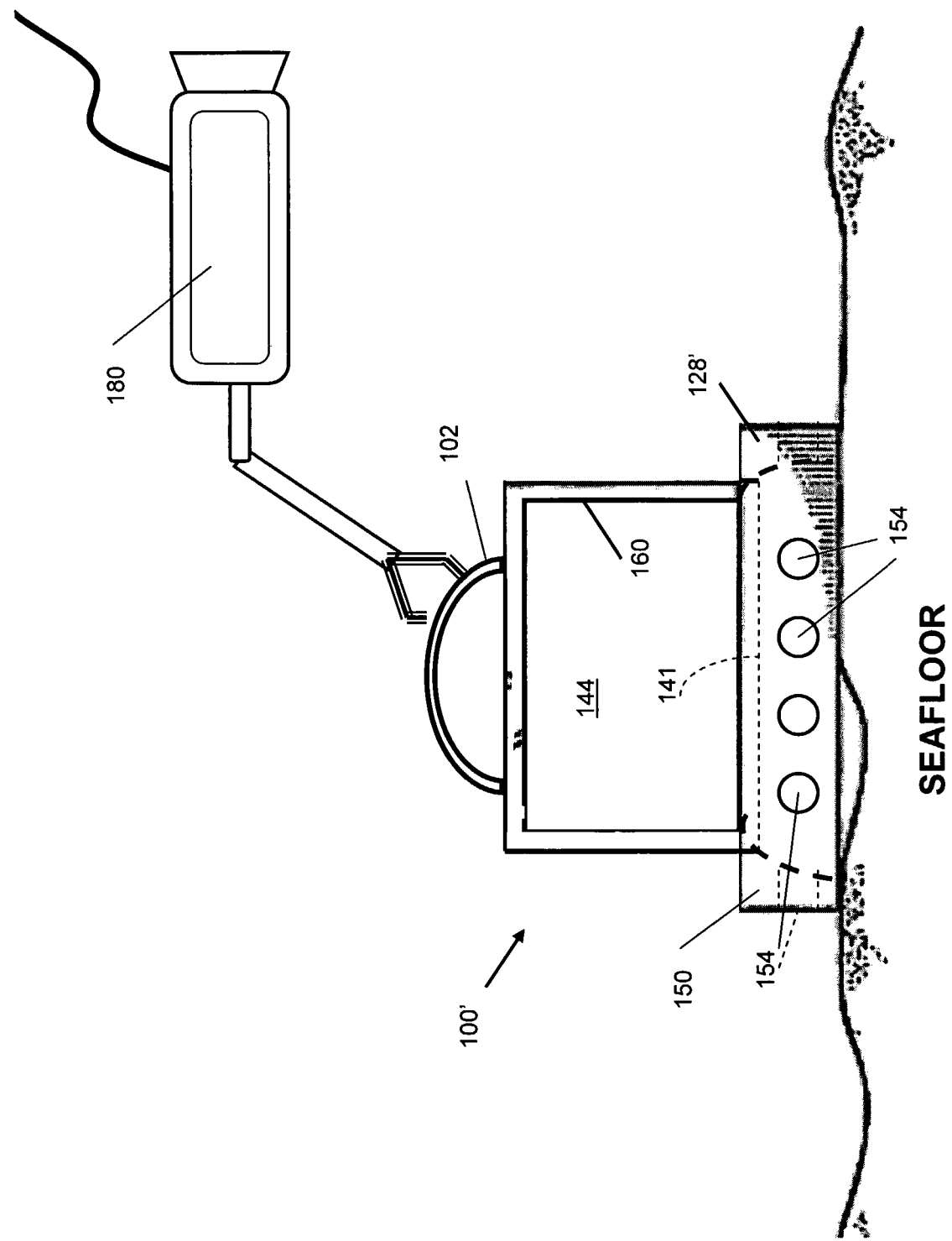
FIG. 4 is a diagrammatic side view of the preferred embodiment of a survey unit according to the present invention.

In the preferred embodiment, the amplifiers, data logging processor and other electronic components are mounted inside the cube 136 to create survey unit 100', shown in FIG. 4. As illustrated, a lightweight anchor 128' is attached at the bottom of cube 136 to provide negative buoyancy, but the dashed lines show an open bottom 150 and openings 154 in the sides of the anchor 128', which ensure that seawater has access to electrode 141 on the bottom of the cube to reduce the risk of distortion of the electric field. Alternatively, legs or a support stand can extend downward from frame 160 to hold the cube at a raised position above the seafloor.

The embodiment of FIG. 4 provides a significant advantage for purposes of deployment. Due to their compact size and the absence of external connections, cables and other protrusions that can be damaged and possibly render the sensor inoperable, the sensors are easily deployed and recovered using an undersea ROV (remotely operated vehicle) 180, so that floats and a separable anchor are not required. This is particularly advantageous for performing measurements in sensitive areas where anchors cannot be released and left behind. In the embodiment of FIG. 4, if MT measurement is desired, a separate housing may be attached to a frame attached to box 136.

Figure 5:
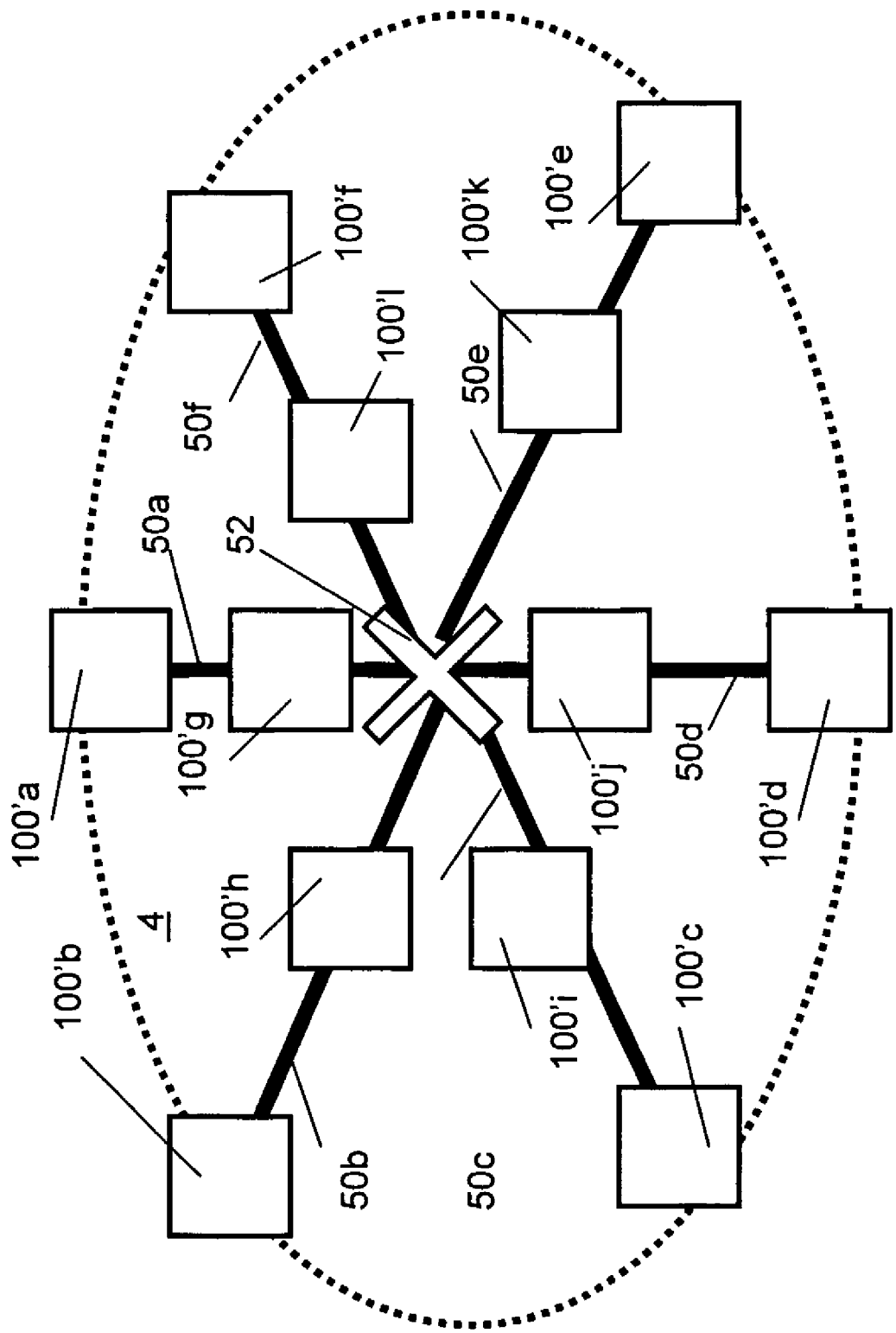
FIG. 5 is a diagrammatic view of an exemplary arrangement of the inventive sensors in a seafloor cable array.

FIG. 5 illustrates an exemplary arrangement of survey units 100'a-l incorporated into a cable array for surveying or monitoring an area of interest 4 on the seafloor. In the example, six cables 50$a$-$f$ spread out in a spoke pattern in which the hub is defined by a tower 52, such as the one described in International Application No. PCT/US2003/39309, a broadband cable or transmittor that provides means for communicating the collected measurements from all sensors on the seafloor to the surface where researchers can access and analyze the collected data.

Surveying unit 100 or 100' can be used to measure artificially generated signals such as those provided from a deep towed instrument, i.e., a "controlled EM source", that transmits controlled electromagnetic signals. An example of a suitable EM transmitter is a 100 to 500 meter horizontal electric dipole towed in close proximity (10-100meters) to the seafloor and injecting $10^2$ to $10^3$ amps into the seawater. Such a transmitter is described by Constable, S. and Cox, C. S. in "Marine controlled source electromagnetic sounding 2. the PEGASUS experiment", *J. Geophys. Res.* 101 (1996) pp. 5519-5530, which is incorporated herein by reference. The transmitter is towed at distances of 10 m to 10 km from the electric field loggers. A potential across the electrodes 164 and 166 is sensed over a frequency spectrum appropriate to the transmitted signals. This spectrum is preferably 0.1 to 100 Hz at a number of discrete frequencies. The amplitude and phase of the controlled source transmissions as a function of range and frequency are used to infer sea floor geological structure. The controlled EM source measurements may be made in the time domain instead of the frequency domain, whereby a discrete frequency is replaced by a rapid turn-on or turn-off of the transmitted signal.

According to the method of the present invention, the survey units 100 or 100' are deployed at different positions on the seafloor within an area of interest for modeling of the seafloor structure. Typically, the surveying units will be deployed from a ship adapted for efficient handling of the units, e.g., with a crane or extendable arm. Exemplary spacing between the survey units is on the order of tens of meters to a few kilometers, with anywhere from 15 to 100 units being deployed. After a predetermined period of time, which may be on the order or several hours to several days, the anchor releases on each of the survey units will be triggered by an acoustic signal from the ship, causing the survey unit to rise to the surface for recovery. The period of time over which data is collected will depend upon the data collection rate and the data storage capacity of the data processing unit. Data accumulated by each of the units is collected and transferred to a processing system for analysis and data output. In the preferred embodiment, interpretation of the data is performed to generate one or more models of resistivity, or apparent resistivity, of the structure across the area of interest.

It will be evident that there are additional embodiments which are not illustrated above but which are clearly within the scope and spirit of the present invention. The above description and drawings are therefore intended to be exemplary only and the scope of the invention is to be limited solely by the appended claims.

What is claimed is:

1. A sensor for electric field measurement unit along three axes for use in resistivity mapping of a floor of a body of water, comprising:
   an assembly comprising three pairs of electrodes, each electrode having an area, and each pair of electrodes disposed orthogonal to each other pair and each pair connected to a resistor, wherein the body of water has a resistivity and the resistor has a resistance value determined according to the relationship $R=rL/a$, where a is the area of the electrodes, L is a separation between each electrode pair, and r is the resistivity of the water;
   wherein each electrode pair generates an output comprising a detected electrical field along an axis corresponding to a direction of separation between the electrode pair.

2. The sensor of claim 1, further comprising a frame for retaining the three pairs of electrode in a fixed relationship in the assembly.

3. The sensor of claim 1, further comprising a manipulation means attached to the assembly for releasably connecting a remotely operated vehicle for deploying and retrieving the sensor.

4. The sensor of claim 1, wherein the output generated by each electrode pair provides input to an amplifier having an input impedance equal to R.

5. A system for modeling seafloor resistivity, the system comprising a plurality of survey units deployed in seawater at different locations on the seafloor, each unit comprising:
   three pairs of parallel electrodes, each pair of electrodes disposed orthogonal to each other pair to form a six sided assembly, wherein the electrodes of each pair have an electrode area and are connected across a resistor having a resistance value determined according to the relationship $R=rL/a$, where a is the electrode area, L is a separation between each electrode pair, and r is a resistivity of the seawater, wherein each electrode pair generates an output corresponding to a detected electrical field along an axis corresponding to a direction of separation between the electrode pair;
   an amplifier for amplifying a signal produced by each electrode; and
   a data logger for receiving and recording an amplified signal from the amplifier;
   wherein the frame is disposed so that each electrode is exposed to the water.

6. The system of claim 5, wherein the amplifier has an input impedance equal to R.

7. The system of claim 5, wherein each unit further comprises a manipulating means for releasably connecting a remotely operated vehicle for deploying and retrieving the survey unit.

8. The system of claim 5, wherein the plurality of survey units are incorporated in a cable array disposed on the seafloor.

9. The system of claim 5, wherein the electric fields are artificially generated using a controlled source electromagnetic transmitter.

10. A method for measuring electrical fields in seawater for resistivity mapping of an area of interest on a seafloor comprising:
    deploying a plurality of survey units within the area of interest, each survey unit comprising three parallel electrode pairs disposed orthogonal to each other, each electrode pair separated by a distance and connected across a resistor having a resistance $R=rL/a$, where r is the resistivity of seawater, L is the separation distance between the electrodes and a is an area of the electrodes;
    amplifying and collecting voltage signals across the resistor of each electrode pair; and
    converting the collected voltage signals into a resistivity measured at a location within the area of interest at which each survey unit was deployed.

11. The method of claim 10, wherein the step of deploying comprises transporting the survey unit to the location in the area of interest using a remotely operated vehicle.

12. The method of claim 11, further comprising, prior to the step of converting, retrieving the survey unit using the remotely operated vehicle.

13. The method of claim 10, wherein the step of deploying comprising connecting each survey unit within a cable array extending across the area of interest.

14. The method of claim 10, wherein the step of amplifying is performed using an amplifier having an input impedance equal to R.

* * * * *